May 28, 1957 J. B. MELVILLE Re. 24,323

LIQUID DISPENSER WITH STIRRING MEANS

Original Filed March 19, 1954

INVENTOR,
JOHN B. MELVILLE
BY Lyon & Lyon
ATTORNEYS

United States Patent Office

Re. 24,323
Reissued May 28, 1957

24,323

LIQUID DISPENSER WITH STIRRING MEANS

John B. Melville, Torrance, Calif.

Original No. 2,743,910, dated May 1, 1956, Serial No. 417,417, March 19, 1954. Application for reissue March 19, 1957, Serial No. 647,176

4 Claims. (Cl. 259—108)

Matter enclosed in heavy brackets [ ] appears in the original patent but forms no part of this reissue specification; matter printed in italics indicates the additions made by reissue.

The present invention relates to a liquid dispenser with improved stirring means, useful in dispensing drinks, particularly drinks which are required to be heated, such as hot chocolate.

Briefly, the present arrangement contemplates an improved liquid dispenser which has stirring means automatically rendered operative in routine handling of the liquid container.

It is a general object of the present invention to provide improved means of this character in which it is unnecessary to assemble a stirrer mechanism on the container after the container is replaced following a dispensing operation.

Another object of the present invention is to provide an arrangement of this character which is pleasing in appearance and intriguing to potential customers of, for example, hot chocolate, so that they are more inclined to purchase such drink.

Another object of the present invention is to provide an arrangement of this character in which the stirrer mechanism is rendered automatically inoperative and operative, respectively, upon removal from and replacement on its heating source.

Another object of the present invention is to provide an improved stirrer mechanism which is relatively simple and inexpensive.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1:
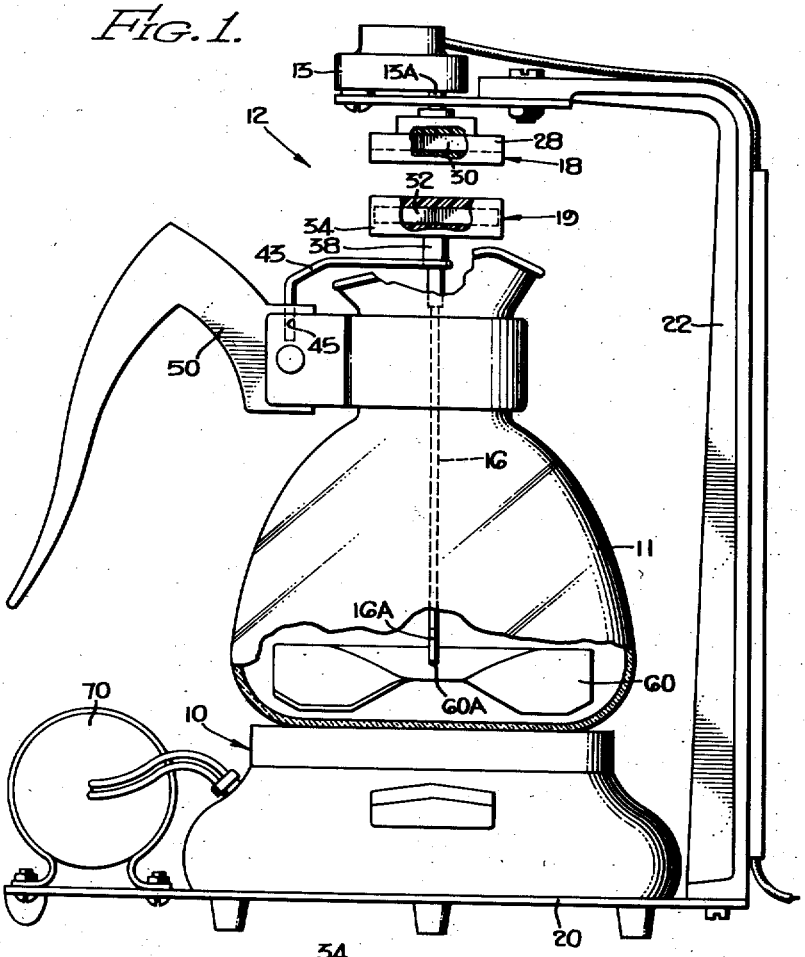
Figure 1 is a view in side elevation and partly in section of apparatus assembled in accordance with the present invention.

As shown in the drawings, the apparatus includes generally an electrical stove 10 upon which rests a glass liquid container 11 having associated therewith a stirring mechanism 12, such stirring mechanism including generally an electric motor 13 which rotates the rod 16 of the stirrer through the magnetically coupled elements 18 and 19.

For these general purposes, the electric stove 10 is mounted on the base 20, to which is attached the upstanding bracket or standard 22, on the upper end of which is mounted the motor 13 having the rotatable output shaft 13A. The shaft 13A has secured thereto a fabricated disc 28 of, for example, plastic insulating material in which is embedded a permanent magnet bar 30 of, for example Alnico. This permanent magnet 30 is generally rectangular in cross section and has a length relatively large in comparison to any one of its cross section dimensions. The cooperating similar bar magnet 32 is embedded in a like fabricated plastic disc 34 which, in turn, is secured to the stirrer shaft 16.

Figure 3:
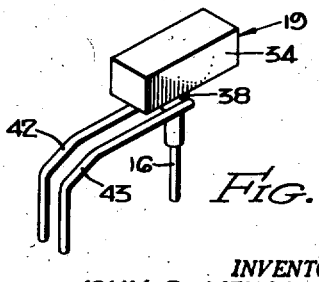
Figure 3 is a perspective view showing the stirrer mechanism with its attachment prongs.

The shaft 16 is supported for rotation about a vertical axis in the stationary bearing member 38. The bearing member 38 comprises generally a bored cylinder having attached thereto a pair of prongs 42 and 43 illustrated in Figure 3, the free ends of such prongs 42 and 43 being secured in corresponding cylindrical holes 45 drilled in the handle 50 of the container 11.

Figure 2:
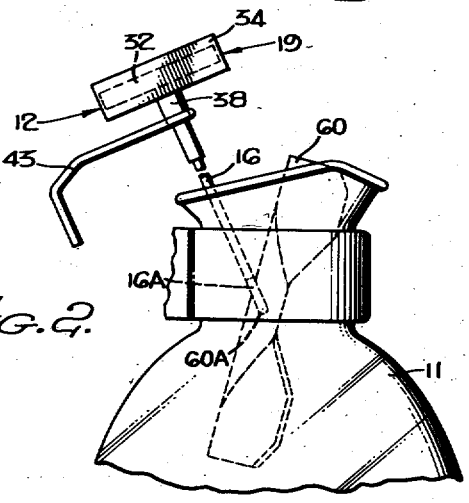
Figure 2 illustrates the manner in which the paddle is coupled to the stirrer mechanism to allow easy insertion and removal of the paddle from the small-necked container.

The rotatable shaft 16 is provided with a hook 16A at its lower end which passes through an enlarged aperture 60A in the paddle 60 so as to allow such paddle 60 to be pivoted with respect to the shaft 16 in the manner illustrated in Figure 2, to facilitate and to allow insertion and removal of the paddle 60 from the interior of the container 11 for cleaning, repair and other purposes.

It is clear that by this arrangement energization of the motor 13 results in direct driving of the bar magnet 30 and the magnetism induced from such bar 30 acting on the similar bar magnet 32 causes the shaft 12 and the paddle 60 to be rotated to thereby cause the contents of the container 11 to be continuously stirred while such liquid is being heated or maintained at a predetermined temperature by the electric stove 10. If desired, the electricity furnished to the stove 10 may be controlled by, for example, a thermostat or by a conventional timer 70.

One feature of the present arrangement is that by the magnetic drive described above may be broken by simply removing the container 11 from the stove 10 as, for example, when it is desired to dispense the liquid from the container. That part of the stirrer mechanism which remains with the container is relatively small, of light weight and does not interfere with the normal dispensing operation. To achieve these general purposes, there must be some vertical spacing between the bar magnets 30 and 32 to allow the container 11 to be lifted from the stove in the process of removing the same, or replacing the same on the electric stove.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim as my invention:

1. In an arrangement of the character described, a base, a stove on said base, a bracket attached to said base and extending upwardly therefrom, a container resting on said stove, a motor mounted on said bracket, rotatable means within said container and supported on said container for rotation about a stationary axis thereon, a first magnet rotatively driven by said motor, a cooperating magnet attached to said rotatable means and spaced from said first magnet by an air gap to allow the container and rotatable means therein to be freely moved onto and from said stove.

2. In an arrangement of the character described, a base, a stove on said base, a bracket mounted on said base and extending upwardly therefrom, a container resting on said stove, said container having a pouring opening in the top thereof, a rotary stirring device in said container carried by a shaft extending upwardly through said pouring opening, mounting means for said shaft readily removably mounted on said container and supporting said shaft for rotation about a first axis fixed relative to said container, said mounting means and shaft being dimensioned and arranged so as to not substantially obstruct said pouring opening, a motor on said bracket above said container, a first permanent magnet driven by said motor about a second axis substantially coincident with said first axis, and a permanent magnet secured to said shaft below said first magnet and separated therefrom by an air gap.

*3. In an arrangement of the character described, a base, a stove on said base, a bracket attached to said base and extending therefrom, a container resting on said stove, a motor mounted on said bracket, rotatable means within said container and supported on said container for rotation about a stationary axis thereon, a first magnet rotatively driven by said motor, a cooperating magnet attached to said rotatable means and spaced from said first magnet by a gap to allow the container and rotatable means therein to be freely moved onto and from said stove said cooperating magnet being supported by said rotatable means out of engagement with said container, said first magnet being maintained out of engagement with said container by said motor.*

*4. In an arrangement of the character described, a base, a stove on said base, a bracket mounted on said base and extending therefrom, a container resting on said stove, said container having a pouring opening in the top thereof, a rotary stirring device in said container carried*

*by a shaft extending upwardly through said pouring opening, mounting means for said shaft readily removably mounted on said container and supporting said shaft for rotation about a first axis fixed relative to said container, said mounting means and shaft being dimensioned and arranged so as to not substantially obstruct said pouring opening, a motor on said bracket adjacent said container, a first permanent magnet connected to and driven by said motor about a second axis substantially coincident with said first axis, and a second permanent magnet secured to said shaft adjacent said first magnet and separated therefrom by a gap, said second permanent magnet being maintained by said shaft out of engagement with said container, said first permanent magnet being maintained by said motor out of engagement with said container.*

References Cited in the file of this patent or the original patent

UNITED STATES PATENTS

| | | |
|---|---|---|
| 1,734,120 | Farrington | Nov. 5, 1929 |
| 1,735,143 | Supervielle | Nov. 12, 1929 |
| 1,826,948 | Nelson | Oct. 13, 1931 |
| 2,350,534 | Rosinger | June 6, 1944 |
| 2,518,758 | Cook | Aug. 15, 1950 |
| 2,711,306 | Levi | June 21, 1955 |